Nov. 14, 1967     W. F. SANTELMANN, JR     3,353,080
REGULATED POWER SUPPLY HAVING SEPARATE
REGULATORS RESPONSIVE TO DIFFERENT
ERROR SIGNAL FREQUENCY COMPONENTS Filed Aug. 6, 1964     7 Sheets-Sheet 1

FIGURE 1

LOW VOLTAGE REGULATOR

FIGURE 2

HIGH VOLTAGE REGULATOR

FIGURE 3

CURRENT REGULATOR

FIGURE 4
LOW VOLTAGE REGULATOR

FIGURE 5
HIGH VOLTAGE INVERTER AND RECTIFIER

FIGURE 7
CURRENT REGULATOR

United States Patent Office 3,353,080
Patented Nov. 14, 1967

3,353,080
REGULATED POWER SUPPLY HAVING SEPARATE REGULATORS RESPONSIVE TO DIFFERENT ERROR SIGNAL FREQUENCY COMPONENTS
William F. Santelmann, Jr., Lexington, Mass., assignor to Walden Electronics Corporation, Arlington, Mass.
Filed Aug. 6, 1964, Ser. No. 387,906
17 Claims. (Cl. 321—2)

ABSTRACT OF THE DISCLOSURE

A regulated power supply includes both a high efficiency low-speed regulator and a low efficiency high-speed regulator. The error signal corresponding to the difference between the output of the power supply and the desired output thereof is divided on a frequency basis, with the low frequency components being used to control the low-speed regulator and the high frequency components controlling the high-speed regulator.

This invention relates to a system for regulation of direct voltage or current utilizing a silicon controlled rectifier for high efficiency, in conjunction with a power transistor for speed of response. More specifically, the invention relates to a power supply of a type in which incoming alternating current energy is rectified and controlled by variable-phase triggering of a silicon controlled rectifier, and the resultant direct-current output is then passed through a power transistor regulator for removal of ripple and fast response to regulation errors before being passed to the output load.

The invention particularly concerns a system in which a single regulating amplifier operates both the silicon controlled rectifier and the power transistor simultaneously. The output voltage, or current, is sensed in a conventional manner by this regulating amplifier, but the output of the amplifier is divided on a frequency basis with the DC and very low frequency components being used to control the silicon controlled rectifier, while the low to high frequency components control the power transistor.

This type of circuit is applicable to voltage regulation within the range of from zero to several hundred volts in a single stage arrangement.

Another important area of application is in the design of high voltage solid state supplies in which the output voltage is greatly in excess of normal power transistor voltage breakdown ratings. In such applications, a DC-DC converter is generally included to transform a low voltage input to a high voltage output. This technique is feasible as high as 100 kv.

The invention may also be used in a current regulator which is the dual of the voltage regulator.

In the prior art, there exist systems which attempt to combine the advantages of fast regulation response typical of a transistor regulator with the very high efficiency of regulation possible with devices such as silicon controlled rectifiers, switching transistor regulators, and magnetic amplifier systems. By itself, the power transistor is relatively inefficient since its regulation performance depends on a variable loss of power within the transistor itself. The silicon controlled rectifier, switching transistor, and magnetic amplifier systems by themselves can be made very efficient, but suffer from a rather long response time. The controlled rectifier and magnetic amplifier systems generally cannot respond to regulation control faster than ½-cycle of the power frequency; the speed of switching transistor response is limited to about 1 cycle of the switching frequency. In addition to these delays, the DC output from any of these three efficient regulators must be filtered with inductance and capacitance to attain a reasonable level of output ripple. These filters are an additional source of regulation delay, which is a major disadvantage of these systems.

In the prior art, several designs have appeared in which an efficient but slow regulator is followed by an inefficient but fast power transistor regulator. Usually, the voltage which appears across the power transistor is limited to a small portion of the total output voltage so that power loss in the transistor is minimized, and the efficiency of the supply is held at a high level. A combination of a switching transistor regulator and power transistor regulator is disclosed in United States Patent 3,068,392. This system utilizes two separate regulating systems, each of which is effective down to DC (zero frequency). The switching transistor regulator senses and controls the voltage across the power transistor and a series current limiting resistor, while the power transistor regulating system senses the actual output of the power supply and controls the power transistor accordingly.

However, even in this system, a fault in either regulating system can cause complete, catastrophic failure of the supply. Also a large number of components are required, with attendant lower reliability.

Accordingly, it is a principal object of the present invention to provide an improved regulated direct voltage or current power supply.

Another object of the invention is to provide a regulated power supply combining high efficiency, high reliability, and fast response in the regulating system.

Yet another object of the invention is to provide a power supply combining the above features with relatively low cost construction.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which.

This present invention is characterized by the use of a single regulating system and a single voltage reference which controls both a silicon controlled rectifier regulator and a power transistor regulator for fast, highly efficient control. Since the power transistor has no authority at DC, the system will operate with normal output voltage even when this power transistor, or any of its driving transistors, are shorted, although ripple performance will be greatly degraded in such an event.

The number of components required in this invention is very small so that the reliability of a power system of this type can be made very high.

In general, a voltage regulator embodying the present invention makes use of two regulators as before, but largely divides their functions according to frequency. The system develops an error signal corresponding to the difference between the output voltage of the power supply and a reference voltage. The low frequency components of the error signal are used to control the conduction angle of a silicon controlled rectifier, and thereby control the output voltage of this stage. The high frequency components are applied to a series regulating transistor at the output of the silicon-controlled-rectifier filter. The latter components, mainly ripple and small transients, are of a low voltage nature and they are readily removed by the transistor.

Since the low frequency (including DC) error signal components controlling the silicon-controlled-rectifier reflect gross changes in the output voltage, only a small amount of regulation need be provided by the transistor. Therefore, the full output voltage of the controlled-rectifier does not have to appear across the transistor. In practice, about ten percent of this voltage is across the transistor, which means that variations in the resistance of the transistor from zero to maximum value can bring about a short-term variation of only ten percent in the regulator output voltage. This is more than the amount required by the system.

The error signal is derived from a sensor which senses the voltage output of the power supply. The sensed output is compared with a reference, and the resulting error signal is amplified by a single amplifying unit. The amplified error signal is divided according to frequency before being used to control the silicon controlled rectifier and the transistor regulator.

Figure 1:
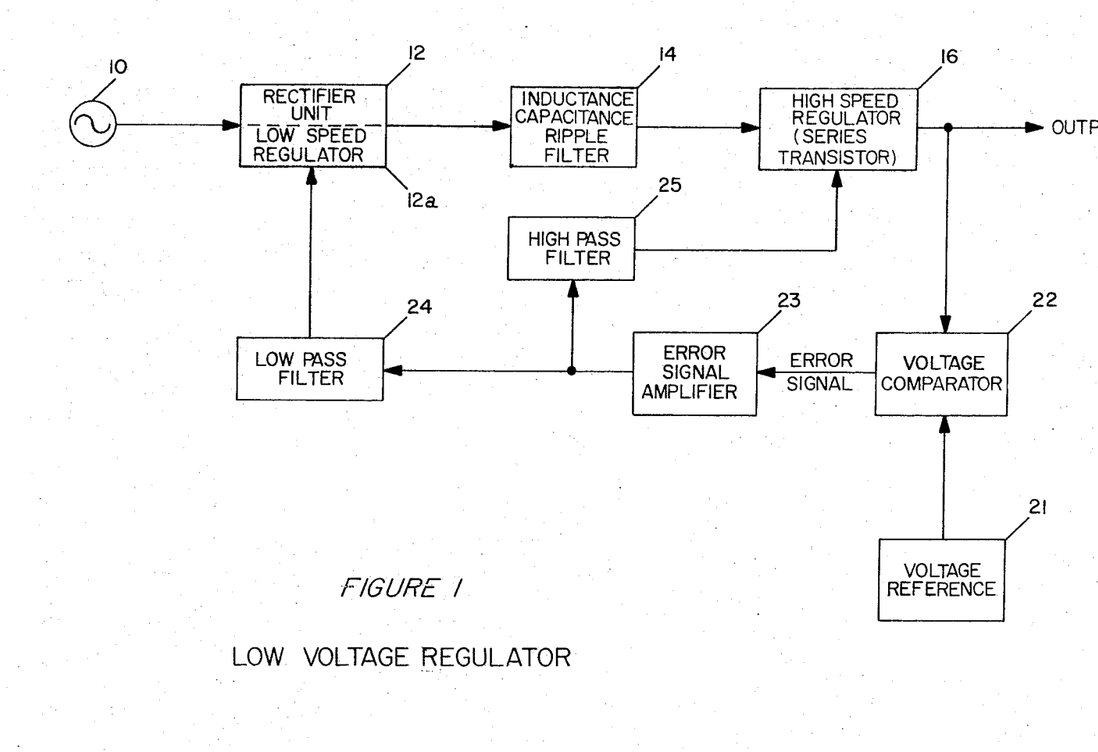
FIG. 1 is a schematic diagram in block form, of a low voltage regulator embodying the invention.

More specifically as seen in FIG. 1, a power supply embodying the invention obtains its input power from an alternating-current source 10 connected to the input of the rectifier unit 12 forming the first stage of the system. The rectifying unit 12 includes a low speed regulator schematically indicated at 12a. The output of the first stage is passed through an inductance-capacitance ripple filter 14 to a high speed regulator 16.

The output of the system is taken from the high speed regulator 16 and the voltage at this point is applied to a voltage comparator 22 which also receives a reference voltage signal from a voltage reference 21. The resulting error signal is amplified by an error signal amplifier 23, which controls the low speed regulator 12a through a low pass filter 24, and also controls the high speed regulator 16 through a high pass filter 25. Since high pass filter 25 does not pass direct current, there is no DC control for regulator 16 and regulator 13 has full control over the direct component of the output voltage.

Figure 4:
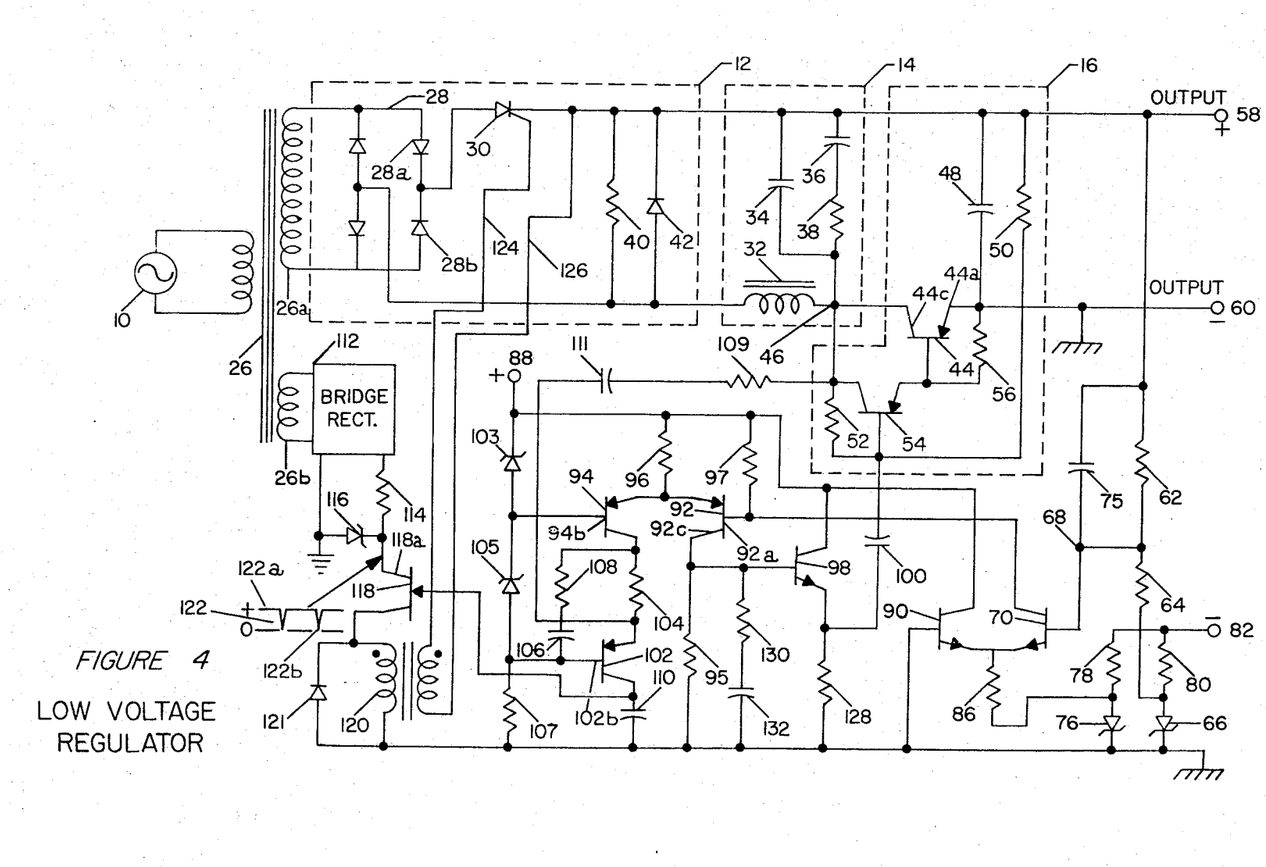
FIG. 4 is a detailed schematic diagram of part of the regulator of FIG. 1.

As shown in FIG. 4 the source 10 is coupled to the rectifier unit 12 by means of a transformer 26, whose secondary 26a is connected to a bridge rectifier generally indicated at 28. The output of the rectifier 28 is passed through a silicon-controlled-rectifier 30 to the filter 14, which comprises an input inductor 32 and capacitors 34 and 36. A resistor 38, in series with the capacitor 36, serves as a damping element to damp the series resonance between inductor 32 and capacitors 34 and 36; it thereby reduces the voltage magnification of the filter 14, at its resonance frequency, with a consequent simplification of the feedback stabilization problem.

The rectifier 28 operates in a conventional manner to provide a full-wave rectifier output having a ripple frequency which is twice that of the source 10. In a manner to be described, the silicon-controlled-rectifier 30 is fired once during each half-wave pulse from the rectifier 28 and the angle of conduction of the controlled rectifier 30, i.e. from the point at which it is fired to the point at which it cuts off, determines the average value of the voltage fed to the filter 14. The cutoff point is fixed by the zero crossing of the alternating voltage from secondary 26a at which instant there is zero voltage across controlled rectifier 30.

Thus, the firing point determines the conduction angle and, consequently, it determines the output voltage of the rectifier unit 12 appearing across the capacitor 34.

The circuit requires that controlled rectifier 30 revert to its non-conducting state during the period near the zero crossing of the incoming voltage from secondary 26a, which requirement is not difficult to satisfy. However, if it should present a problem, the single silicon-controlled-rectifier may be replaced by two such units connected at positions 28a and 28b instead of the non-controlled rectifiers indicated in FIG. 4. The controlled rectifier 30 would be omitted and replaced with a conductor between anode and cathode points. The gate firing signals would be connected to the gates of the new controlled rectifiers 28a and 28b. This latter circuit will present no controlled-rectifier turn-off problem since each of the two units will be turned off with a half-cycle of reverse potential. The circuit of FIG. 4 is usually preferred because of its lower cost.

A rectifier 42, connected across the input of the filter 14, is used as a damper to carry the current flowing in inductor 32 during the periods when controlled rectifier 30 is non-conducting. A resistor 40 provides a path through which controlled rectifier 30 can pass a current at least as great as its holding current, the minimum conduction current necessary to maintain low impedance forward conduction. This resistor assures that controlled rectifier 30 will remain conducting after its gate is pulsed, even when the current in inductor 32 drops to less than holding current.

The high speed regulator 16 includes a transistor 44 connected, as shown, between the negative terminal 46 of the filter 14 and the negative output terminal. A capacitor 48 connected across the output terminals has a low impedance at high frequencies and is used as a means of stabilizing the regulating feedback loop while also assisting in the maintenance of a low output impedance at high frequencies.

A small portion of the output voltage delivered to the positive and negative output terminals 58 and 60 is maintained across transistor 44 by local feedback operation involving resistors 50 and 52, where resistor 50 is correspondingly larger than resistor 52.

The exact voltage proportion across the transistor 44 is not crucial. However, for the purpose of illustration a figure of 10 percent will be assumed in the following description. In this case the resistance of resistor 50 will be nine times as great as that of resistor 52. Resistors 50 and 52 comprise a voltage divider across capacitor 34 such that, aside from the effects of base current in a transistor 54, 90 percent of the voltage from capacitor 34 appears between terminal 58 and the base of transistor 54. The transistors 54 and 44 operate as tandem emitter followers which transfer the voltage on resistor 50, less the small base-emitter bias voltages, to terminals 58 and 60. Since 90 percent of the voltage on capacitor 34 is thus delivered to the output, the remaining 10 percent appears across transistor 44. This ratio is independent of voltage across capacitor 34. Accordingly, since no DC control from the regulating amplifier is applied to the base of transistor 54, the only DC control at the output is from the voltage on capacitor 34, which in turn is a function of the phase control of controlled rectifier 30.

It is possible to apply an AC control signal to the base of transistor 54 from the regulating amplifier by way of a capacitor 100 (with reference to ground potential at the emitter of transistor 44). At sufficiently high frequencies, say above 10 c.p.s., capacitor 100 is able to overcome the effects of resistors 50 and 52, which then revert to a mere biasing function. Series transistor 44 is then driven between base and emitter, through transistor 54, and controls the output voltage as a simple series regulator. The AC control signal consists primarily of components necessary to oppose the power frequency ripple found on capacitor 34 and absorb transients in line voltage and load current. Consequently, the connector-emitter voltage of transistor 44 contains virtually all of the ripple and transients found on the voltage from capacitor 34, and the voltage delivered to terminals 58 and 60 is thus essentially free of both ripple and transients.

The amplitude of voltage ripple and transients is usually less than 10 percent of the capacitor 34 voltage, so that transistor 44 has an adequate voltage margin for performing this regulating function without saturating on or off. Since a small portion of the output voltage appears across transistor 44, while the entire load current passes through it, the transistor power dissipation is low and efficiency is enhanced.

The output voltage of the power supply is sensed by means of a voltage divider comprising resistors 62 and 64 in series with a grounded temperature-compensated Zener diode 66. Thus, the voltage at a summing point 68 between the resistors 62 and 64 varies in proportion to variations in the output voltage. A capacitor 75, which shunts resistor 62, passes high frequency output voltage disturbances directly to the summing point 68 without the attenuation produced by resistors 62 and 64, thereby increasing the regulating loop gain and overall regulation performance at high frequencies.

The summing point 68 is connected to the base of a transistor 70 which forms a differential amplifier with a transistor 90 whose base is grounded. Both transistors are operated at very low collector current for minimum base current loading of the summing point 68. Emitter bias current is provided by a resistor 86 connected to a Zener negative voltage regulator 76. The regulator 76 operates in conjunction with a resistor 78 connected to the negative terminal 82 of a power supply (not shown) for the amplifier.

The output of the transistor 70 is applied to the base 92a of a transistor 92, which is connected to cooperate with a transistor 94 as a second differential amplifier. Specifically, the transistors 92 and 94 share a common emitter resistor 96. This provides two isolated outputs in the two collectors, with the correct polarities for the control of an SCR trigger circuit from the collector of transistor 94 and the control of the power transistor series regulator from the collector of transistor 92. A signal causing an increase in the collector-emitter current of the transistor 92 will change the voltage across the resistor 96 in such a manner as to decrease the base-emitter current in the transistor 94 and thus decrease the emitter-collector current in the latter transistor. The output of the transistor 92, appearing at its collector 92c, is current amplified by a transistor 98 connected in an emitter follower circuit. The output of the transistor 98 is coupled to the high speed regulator 16 by way of the capacitor 100.

The capacitor 100 operates as a high pass filter in conjunction with the resistances 50 and 52. The low frequency cut-off point of this filter is the lowest frequency for which regulation by the high speed regulator is desired.

The output of the transistor 94 is fed by way of a resistor 104 to a transistor 102 connected in a common base circuit. A capacitor 106 and a resistor 108, connected in series between the collector 94c and the base 102b, effectively bypass the high frequency output of the transistor 94, thus operating as a low pass filter for the signal fed to the transistor 102. The high frequency cut-off point of this filter corresponds to the low frequency cut-off point of the filter comprising the capacitor 100. A pair of Zener diodes 103 and 105, in series with a resistor 107 between the terminal 88 and ground, maintain the bases 94b and 102b at their required bias potentials.

The transistor 102 operates as an impedance transforming device having a very high output impedance by virtue of its common base connection. Thus it performs as an essentially constant current source connected to charge a capacitor 110. The capacitor 110 is incorporated in a control circuit for the silicon controlled rectifier 30, and the rate of change of voltage across this capacitor determines the firing point of the rectifier 30.

More specifically, a bridge rectifier 112 powered from a secondary 26b of the transformer 26, provides a pulsating output corresponding exactly in phase to the output of the rectifier 28. The output of the rectifier 112 is passed through a clipping circuit comprising a series resistor 114 and a Zener diode 116. The resulting clipped signal 122 is applied to the second base 118a of a unijunction transistor 118.

The output voltage of the rectifier 112 is much greater than the breakdown voltage of the Zener diode 116. Accordingly, the waveform of the voltage between the second base 118a and ground is as illustrated at 122, with a relatively high constant level shown at 122a interrupted by sharp dips, as at 122b. The dips occur at the ends of each half-wave pulse in the output of the rectifier 112 and thus they coincide with the end of each half-wave pulse from the rectifier 28 applied to the silicon-controlled rectifier 30.

As the capacitor 110 is charged by the transistor 102 the voltage across the capacitor increases until it reaches the firing point of the unijunction transistor 118. At this point the transistor conducts and a sharp current pulse passes through the primary of the transformer 120. A corresponding pulse is applied to the silicon-controlled-rectifier 30 by means of conductors 124 and 126 and this fires the rectifier 30. The rectifier 30 continues to conduct until it is extinguished by the dropping off of the output voltage of the rectifier 28 toward the end of the half-cycle pulse.

The firing of the transistor 118 discharges the capacitor 110. The voltage dip 122b assures firing of the unijunction and discharge of capacitor 110 at the end of each AC half-cycle pulse. Thus, the capacitor begins to charge at the beginning of each half-cycle pulse in the outputs of the rectifiers 28 and 112 and the time at which its voltage causes the transistor 118 to fire depends on its charging rate, i.e. the magnitude of the current from the transistor 102. This current in turn depends on the low frequency component at the summing point 68. Therefore, the summing point 68 voltage determines the firing point of the silicon-controlled-rectifier 28 and by this control over the firing angle of the rectifier, it controls the output voltage of the rectifier unit 12. The output voltage maintained by the regulator is a function of the ratio of the resistances of the resistors 62 and 64 and thus the voltage can be set by adjusting either the resistor 62 or 64. More particularly, the net voltage at the summing point 68 is an error voltage corresponding to the sum of the high and low frequency components from the system output, and a negative reference voltage from the diode 66. This error signal is used to control the high speed and low speed regulators in such manner as to minimize the magnitude of the error signal.

Operation of the regulator will be better understood by considering a specific example. Assume that the output voltage of the system is at its proper level and that there is a stepwise increase in the voltage from the source 10. The output voltage of the rectifier unit 12 will immediately undergo a similar increase which will pass through the filter 14 and regulator 16 to the output terminals. The initial effect of the disturbance is relatively fast and therefore the voltage rise is largely coupled by the capacitor 75 from the output terminal 58 to the summing point 68.

The voltage at this point increases, i.e. becomes more positive, thereby increasing the collector current in the transistor 70. This results in a corresponding increase in the emitter-collector current in the transistor 92. Thus, the collector-emitter current of the transistor 98 increases with a resultant increase in the voltage drop across its load resistor 128. The voltage at the upper end of this resistor therefore increases, i.e. becomes more positive, and this increase is passed by the capacitor 100 to the transistor 54.

Consequently, the emitter-collector current in the transistor 54 decreases and this reduces the voltage drop across the resistor 56, thereby reducing the base-emitter current in transistor 44. This increases the effective resistance between the collector 44c and emitter 44a, and the resulting increased voltage drop across the transistor 44 decreases the output voltage. This decrease offsets the increase resulting from the original disturbance and it occurs almost immediately after the increase in voltage. Accordingly, only a small voltage spike of short duration is passed to the output. The duration of the spike is short and largely absorbed by capacitor 48 and therefore is essentially eliminated from the output of the system.

It will be noted that during the above sequence, the signal from the summing point 68 also reaches the transistor 94. However, because of the low pass filter action provided by the capacitor 106 and resistor 108, this signal which is of a high frequency nature, does not affect the operation of the transistor 102. Thus there is no immediate change in the firing angle of the silicon-controlled-rectifier 30. However, if the line voltage change at 10 persists, the firing angle will change accordingly to maintain the output constant.

There is preferably a very high gain around the high frequency loop and this, together with the phase shifts inevitably encountered at high frequencies, raises the problem of oscillation. To prevent this from occurring one may make use of a damping arrangement, such as a lead network comprising a resistor 130 and capacitor 132 connected in series between the collector 92c and ground. At lower frequencies in the high frequency band, this network has relatively little effect because of the reactance of the capacitor 132. As the frequency increases, the effect of this capacitor becomes more and more pronounced. That is, because of the decrease in the impedance of the lead network, a substantial current flows through the network, thereby reducing the input to the transistor 98 and also imposing a desirable phase shift on the amplified signal. At still higher frequencies, the reactance of the capacitor 132 becomes negligible and the loop gain levels off to a relatively low value determined by resistor 130. The values of the components 130 and 132 are generally best determined empirically until the desired characteristic of maximum gain without oscillation is obtained.

In a similar manner, the network comprised of a resistor 109 and a capacitor 111 assists in the stabilization of the low frequency regulator feedback loop which involves transistors 102 and 118, controlled rectifier 30, and filter 14.

When the corrective action of the high speed regulator 16 takes place and the output voltage is returned almost to its original value, the voltage at the summing point 68 corresponds to the difference between the new value and the original value. The amplification in the transistors 70, 92, 98, 54 and 44 increases this small error signal to the relatively high level required to maintain the output voltage close to the desired level. After a short time, the transistor regulator begins to lose control of the voltage because capacitor 100 cannot pass a sustained control signal.

More specifically, there is no longer a fast changing signal to be passed by the capacitor 100 to the high speed regulator 16. The voltage of this capacitor therefore slowly decreases. Thus the base-emitter current of the transistor 54 increases and the effective resistance of the transistor 44 decreases. This gives rise to a slowly increasing voltage at the output terminals 58–60. The voltage increase is communicated to the summing point 68 by the resistor 62.

The resulting increase in the error voltage brings about the above-described sequence in the transistors 70, 90, 92 and 98. However, because of its slow nature, it is not passed to the high-speed regulator 16.

On the other hand, the resulting increase in emitter-collector current in the transistor 92 causes a decrease in the current through the transistor 94. This slow change is passed to the transistor 102, whose emitter-collector current also decreases, thereby diminishing the charging rate of the capacitor 110. This causes the transistor 118 and silicon-controlled-rectifier 30 to fire later in each conduction cycle, thereby decreasing the output voltage of the rectifier unit 12. This process continues until the high speed regulator 16 has returned to its initial state and the increase in input voltage has been fully offset by a change in the conduction angle of the silicon-controlled-rectifier 30.

It will be noted that the high speed regulator 16 operates fast enough to reduce the ripple level in the output of the ripple filter 14 to almost negligible proportions.

The effectiveness of the system described above is demonstrated by the fact that it is capable of maintaining an output voltage within 0.001 percent of the desired level in the presence of ten percent variations in the input voltage from the source 10.

A particular advantage of the power supply is its relatively "fail-safe" operation. The transistor 44 is the element most likely to fail and if this does happen, its collector and emitter terminals will effectively be connected together. Accordingly, there will be no high frequency regulation. However, this will not affect operation of the low frequency system associated with the silicon-controlled-rectifier 30. Thus overall regulation will continue, although the response to high frequency disturbances will of course, suffer until the transistor 44 is replaced.

Figure 2:
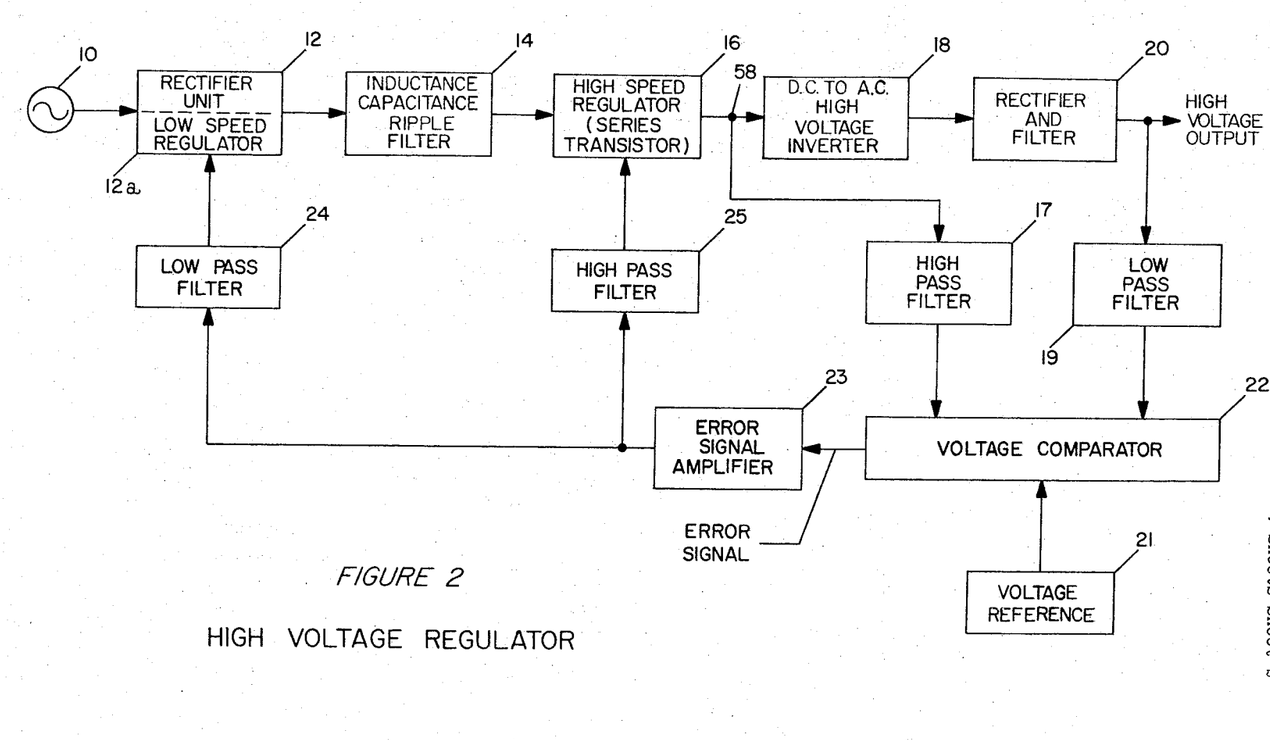
FIG. 2 is a schematic diagram in block form, of a high voltage regulator.

Operation of the invention in a high voltage regulating system is illustrated in FIG. 2. The circuit here is similar to that of FIG. 1, but includes, in addition, a DC to AC high voltage inverter 18, a rectifier and filter 20 and two filters 17 and 19. The function of inverter 18 is to create a high output voltage from an input voltage of such magnitude that it can be handled easily by the conventional transistor in the regulator 16. Rectifier and filter 20 functions to convert this high voltage AC output to a well filtered DC form. It normally consists of a voltage multiplying rectifier-capacitor arrangement, with an RC ripple filter.

The process of conversion from low voltage DC to high voltage DC involves significant high frequency phase shifts between input and output which impose great difficulties in the stabilization of the regulating feedback loop if output voltage sensing is used as in FIG. 1. This problem is obviated by the use of filters 17 and 19. The high voltage DC output (up to a frequency limit of a few cycles per second) is sensed by filter 19. In this frequency range, inverter 18 and rectifier and filter 20 do not contribute substantial phase shift and the feedback loop is stable. Above this frequency, filter 17 begins to pass more signal from the low voltage terminal 58 at the input to inverter 18 than is received from the high voltage output through filter 19. Thus, above a frequency of a few cycles, the feedback loop essentially avoids the high voltage circuits completely and their phase shifts do not pose a feedback stability problem. This circuit is then equivalent, at high frequencies, to FIG. 1, and is therefore easily stabilized. Yet it maintains voltage sensing directly at the high voltage output terminals, which is necessary to achieve regulation performance in the 0.001 percent to 0.01 percent range.

Figure 5:
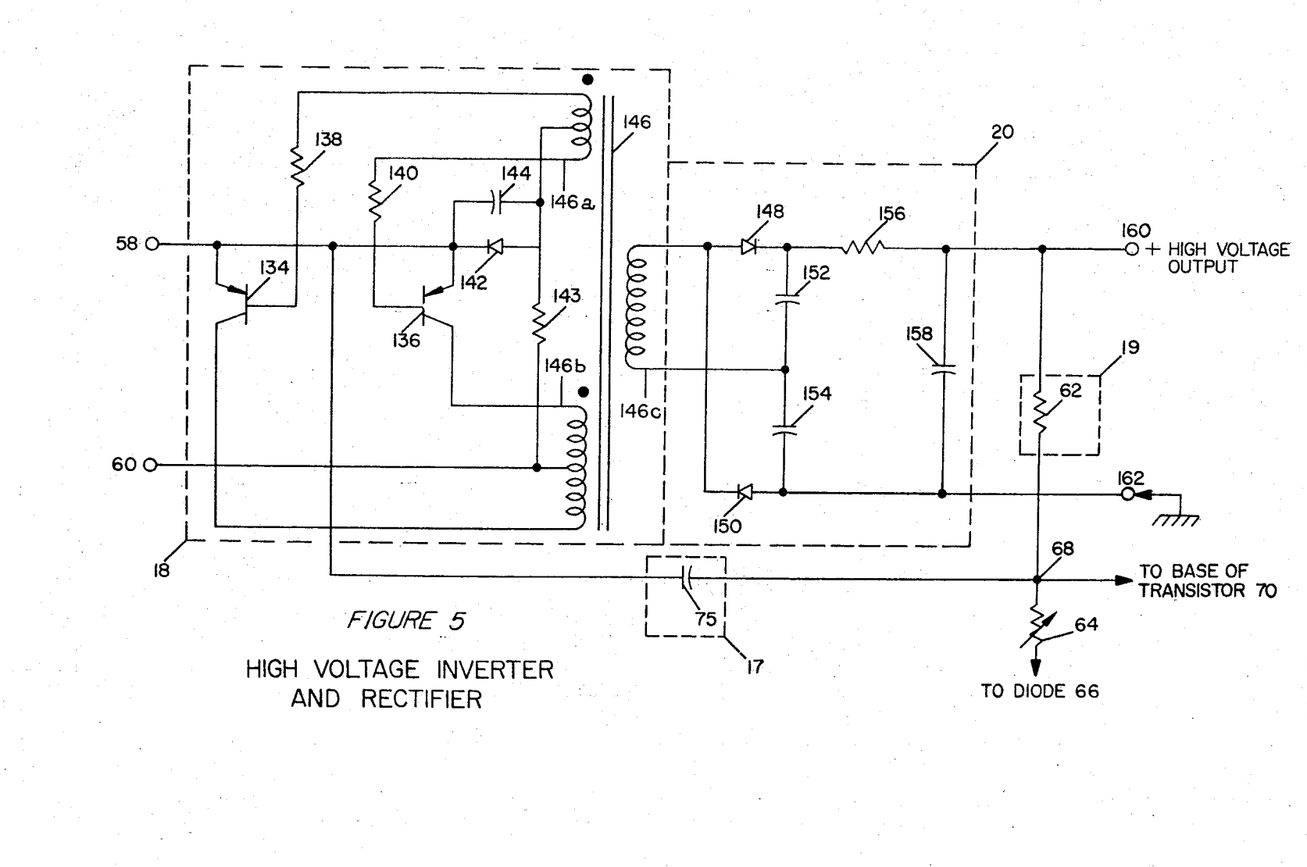
FIG. 5 is a detailed schematic diagram of the high voltage inverter and rectifier used in the regulator of FIG. 2.

FIG. 5 indicates the type of DC to AC high voltage inverter 18 and rectifier and filter 20 which might be used along with low pass filter 19 and high pass filter 17. The terminals 58 and 60 are the same in FIG. 4. Transistors 134 and 136 comprise a push-pull power oscillator which drives winding 146b on a transformer 146. Feedback voltage from winding 146a drives the bases of these two transistors and thereby sustains oscillation. The waveform on winding 146b is square as a result of operation of transistors 134 and 136 as high speed ON-OFF switches. Resistor 143, rectifier 142, and capacitor 144 comprise a starting circuit which carries transistors 134 and 136 into a high-gain bias condition from which oscillation will grow as DC power is applied to terminals 58 and 60. The desired high voltage AC output is derived from winding 146c. This output is applied to rectifiers 148 and 150 which charge capacitors 152 and 154. Rectifiers 148 and 150 conduct alternately, each once per cycle of the incoming frequency, which may run between the broad limits of 100 to several thousand cycles per second. The capacitors 152 and 154 are each charged to the peak value of the voltage found on winding 146c so that the total voltage developed is twice the peak voltage from this winding. This particular type of voltage doubler rectifier circuit is advantageous because one of the two capacitors in series is charged while the other is discharged so that the output ripple is substantially less than in a voltage doubler circuit wherein both capacitors charged simultaneously and discharged simultaneously. The high voltage DC power from capacitors 152 and 154 is passed through a ripple filter comprised of a series resistor 156 and shunt capacitor 158, which function to reduce the ripple content to the desired level. It is relatively convenient to reduce this ripple content to the range between 0.001 percent and 0.01 percent peak-to-peak at an operating frequency between 500 and 1500 c.p.s. The circuit shown is for a positive high voltage output at a terminal 160.

Low pass filter 19 and high pass filter 17 may be easily implemented in FIG. 5 by resistor 62 and capacitor 75, respectively, connected to the summing point 68. Resistor 62 passes a signal at frequencies below the point where the regulating loop gain assumes control. At all higher frequencies, the capacitor 75 is the predominant feedback path, with the shunting path consisting of inverter 18 and rectifier and filter 20 in series with resistor 62 having negligible effect. Operation from the summing point 68 to terminals 58 and 60 is then identical to that discussed in connection with FIG. 4.

The circuit of FIG. 5 indicates a positive high voltage output, but it is equally feasible to provide a negative high voltage output, in which case the resistor 62 would be connected to the negative high voltage terminal 162, and 160 would be grounded. Certain other changes would be required, notably a change in the polarity of the voltage reference 66 of FIG. 4.

It is often desirable to measure output current and provide overload protection in the form of a current limiter. A current limiter is essentially a current regulator which is set for a desired maximum output current the supply is intended to deliver under normal conditions. During normal operation, this circuit is inactive, but in the event of current overload, it assumes control from the voltage regulator and converts the system into a current regulator. The output voltage is then allowed to drop to a level, possibly zero, at which this regulated value of current can be passed by the output load.

When the overload is removed, and the output current falls below the current regulated value, the output voltage will rise until the voltage regulator once again reassumes control and normal operation follows. This type of circuit is very useful in high voltage work since it permits the system to recover full performance after a flashover or other high voltage breakdown. Fuses are not effective at the low currents and high voltages frequently required, and obviously cannot recover after they have operated.

Figures 6, 6A:
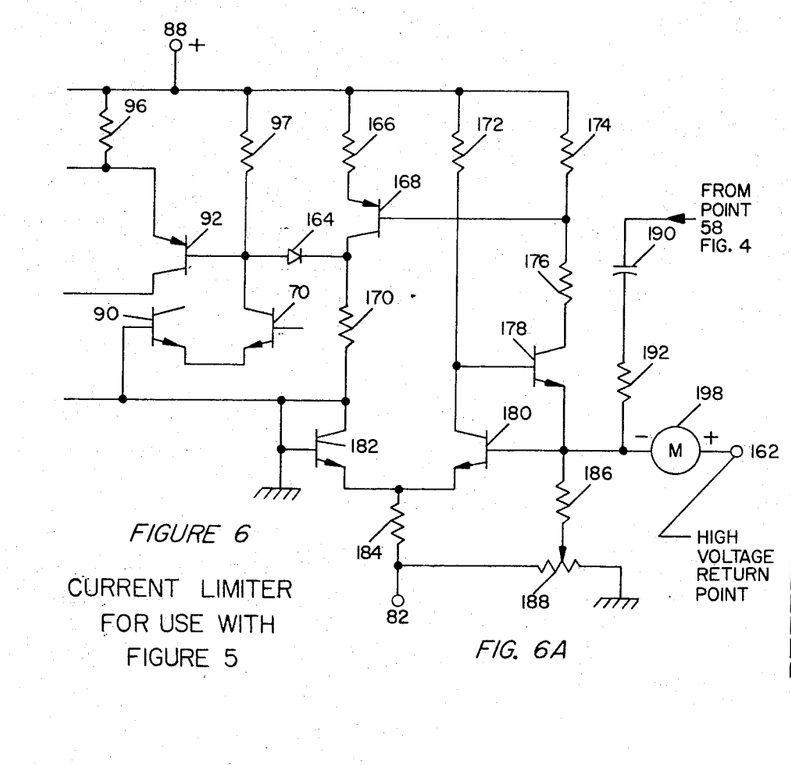
FIGS. 6A and 6B are detailed schematic diagrams of current limiters which may be used with the circuit of FIGS. 2 and 5.
Figure 6B:
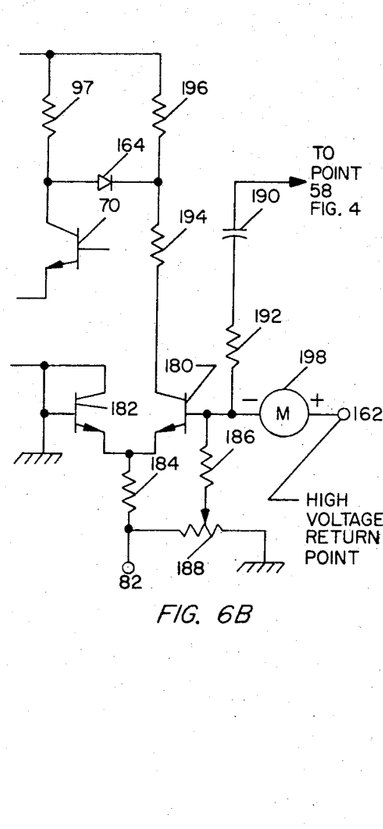

The current limiters illustrated in FIGS. 6a and 6b operate in conjunction with a high voltage DC regulator comprised of the circuits in FIGS. 4 and 5. The circuit of FIG. 6a is preferred where the potential of terminal 162 of FIG. 5 must be held nearly constant for optimum load regulation performance as output load current is varied. A simpler circuit is presented in FIG. 6b in which the terminal 162 will vary about 0.6 volt from no-load to full-load output current. This 0.6 volt change will be added to the voltage regulation of the supply. In many cases this is acceptable, but where it adds excessively to the load regulation performance of the supply, the circuit of FIG. 6a is recommended. It will hold the variation of terminal 162 to about 50 mv. over the full load current range.

With reference to FIGS. 5 and 6a, output load current flows in a conventional sense, out of terminal 160, through the external load, returning to point 162. Since the voltage regulating system described above operates with reference to ground, it is desirable for the circuit of FIG. 6a to provide a current path for terminal 162 which can assume the full load current range while the voltage at this terminal is held very close to ground potential. This is accomplished by means of a feedback arrangement comprising a differential amplifier formed from transistors 180 and 182 and emitter follower transistor 178. Because of the feedback, the base of transistor 180 is a current summing point, and its base current is close to zero.

If the base current tends to increase, the collector voltage of transistor 180 decreases. This reduces the emitter current of transistor 178, thereby tending to decrease the base current to its original value. If the base current tends to decrease from its close to zero value, the reverse operation takes place, with the emitter current of transistor 178 increasing to make up the difference. The circuit is provided with resistance values which causes the base of transistor 180 to operate near ground potential.

A bias current is established through resistor 186 by a variable voltage adjusted by potentiometer 188 connected to the negative terminal 82. The bias current in resistor 186 is adjusted to be equal to the maximum output current desired from the high voltage supply.

In the event of zero load current, the emitter of transistor 178 supplies merely the bias current through resistor 186. As the load current increases, less current is required from the emitter of transistor 178 and eventually, when the load current approaches the bias current in resistor 186, the emitter current in 178 approaches zero.

In normal operation then, transistor 178 carries a normal amount of current through load resistors 174 and 176. The transistor 168 is maintained in saturated conduction under this condition, and resistors 166 and 170 are so proportioned as to maintain diode 164 non-conducting. As load current increases and transistor 178 approaches cutoff, transistor 168 is no longer maintained in saturated conduction, and its collector voltage begins to fall negatively. This action eventually brings into conduction diode 164 which is able to assume control from transistor 70 and convert the regulator to current regulation. That is, current through diode 164 increases the base current in transistor 92, with a resultant decrease in system output voltage in the manner described above with regard to FIG. 4.

A wide range of current limit settings is possible by variation of potentiometer 188, and in practice settings for 10 percent to 120 percent of rated load current are feasible. Since all load current flows into the summing point, a milliammeter 198 may be inserted to provide an indication of output current while maintaining the case of the milliammeter at a very low voltage to ground. The circuit presented here is of primary use in supplies operating in the microampere to low milliampere output range. Resistor 192 and capacitor 190 provide damping of the current regulator feedback loop from a signal taken at the positive input to the high voltage inverter.

The circuit of FIG. 6b is similar in operation to that of FIG. 6a but lacks transistors 178 and 168. Diode 164 operates as before but is controlled directly from transistor 180. Since transistor 180 must then operate from near cutoff to a normal bias current in order to operate diode 164, the base voltage on transistor 180 varies from about −0.6 v. to zero as the output load current varies from zero to full load.

Figure 3:
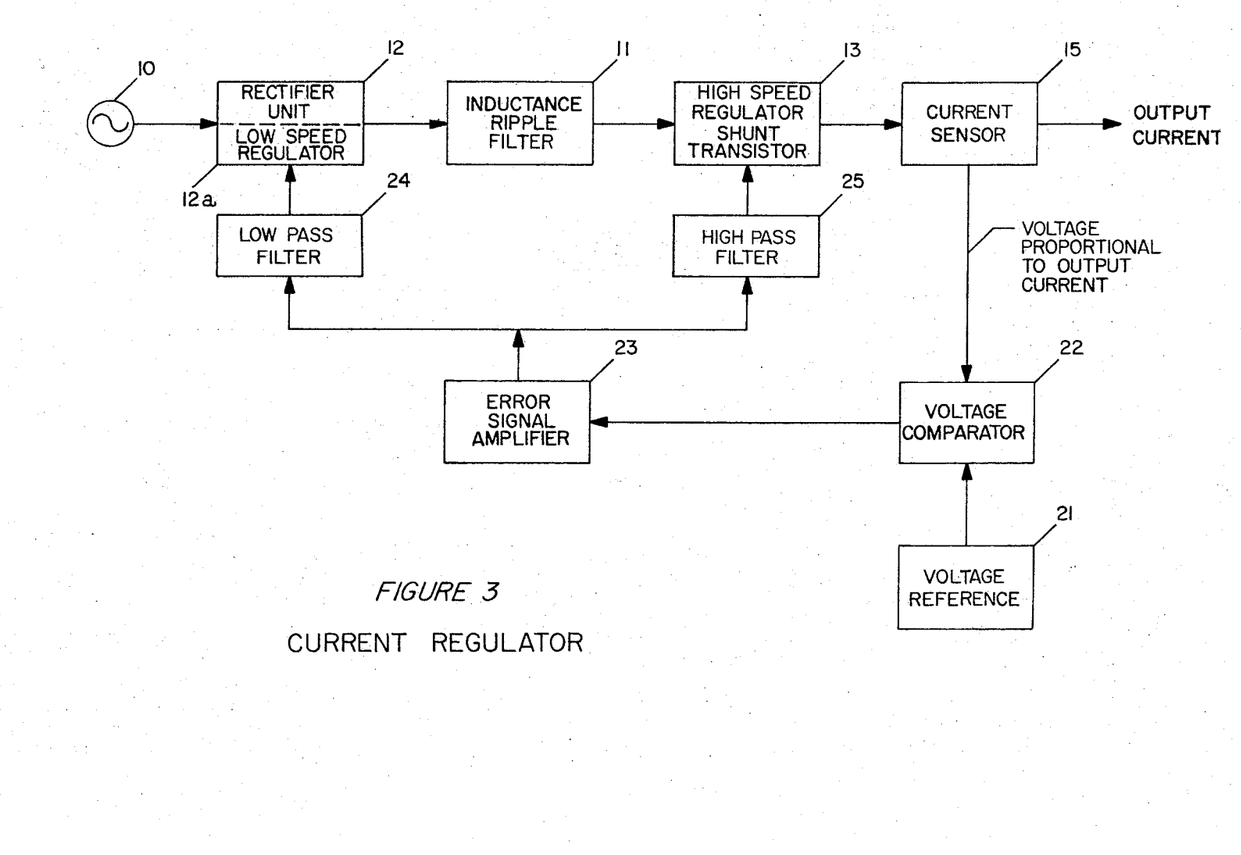
FIG. 3 is a schematic diagram in block form, of a current regulator.

FIG. 3 presents a further adaptation of the invention to the regulation of current. This is a dual of the voltage regulating system and is intended to provide a high output impedance at all frequencies, as opposed to the low output impedance of the voltage regulation system presented in FIG. 1. The output of the controlled rectifier low speed regulator 12a is filtered by a filter 11 containing only a series inductance, since the addition of shunt capacitance across the output at this point would produce a low output impedance. Inductance alone is sufficient to reduce the ripple current to a ten percent peak-to-peak level at power line frequencies. A shunt transistor high speed regulator 13 is placed across the output line in a circuit which establishes a bias current through the transistor of about ten percent of the output current. The control of this bias current is entirely a function of the low speed regulator 12a, and only fast regulating control is presented to regulator 13 from high pass filter 25.

As a result, the bias current in regulator 13 will be found to vary between the limits of five and fifteen percent as it absorbs the assumed ripple from filter 11. Consequently, the current passing through current sensor 15 to the output terminal has very little ripple and transient content. The function of the current sensor, possibly a low resistance precision power resistor, is to convert the output current to a voltage proportional thereto. The output voltage from the current sensor is passed to voltage comparator 22 from which point operation of the circuit is similar to that of FIG. 1.

Figure 7:
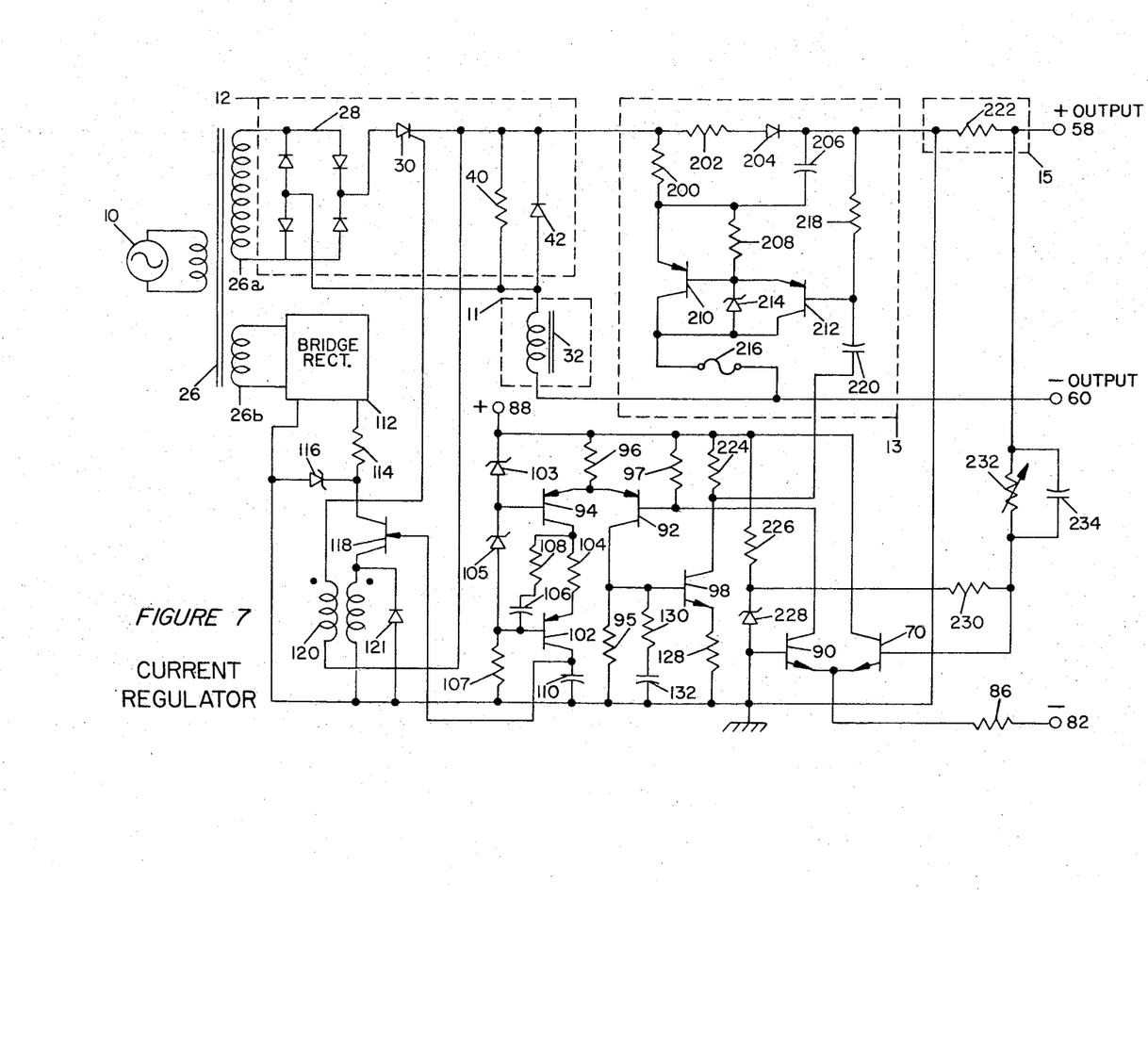
FIG. 7 is a detailed diagram of the current regulator of FIG. 3.

More specifically, a current regulator of this type is presented in FIG. 7. The controlled rectifier low speed regulator 12 is identical in all respects to that used in FIG. 4. The ripple filter 11 consists solely of inductor 32. The output current sensor 15 is shown as resistor 222. The function of the low pass filter 24 is provided, as previously, by capacitor 106 and resistor 108, and the high pass filter function 25 is provided by capacitor 220 with resistor 218.

Output current variations are converted to voltage variations by resistor 222. This voltage is compared with a reference voltage produced on Zener diode 228 by current from resistor 226. The comparison is accomplished by resistors 230 and 232 connected to the base of transistor 70. The feedback action involving the entire regulator is such that the base potential on transistor 70 is maintained very close to ground in a manner identical to that of an operational amplifier. If the resistance of resistor 232 is varied, the output current will vary in direct proportion to its resistance value.

The control of the low speed regulator from the base of transistor 92 to the gate of controlled rectifier 30 is identical to the operation of FIG. 4. However, there is a slight change in the connection of transistor 98 in that the output is taken from the collector of this transistor rather than its emitter in order to obtain the proper polarity of control signal for shunt regulator operation. Capacitor 220 then carries the high speed regulation control signal into the high speed regulator 13.

The high speed regulator 13 consists of a power transistor 210 and a driver transistor 212 with associated biasing networks. Output current passes through resistor 202 and rectifier 204. It is desired that a current of about ten percent of the output current flow through transistor 210 to establish a bias current that will enable it to function as a high speed shunt regulator. The sum of the voltage drops on resistors 200 and 218, plus the drops from emitter-to-base on transistors 210 and 212 must equal the voltage drops on resistor 202 and rectifier 204 regardless of the output current level. In a typical situation, rectifier 204 is a silicon unit having a voltage drop about twice that of a germanium junction such as used in transistors 210 and 212, so that the voltage on rectifier 204 is closely equal to the sum of the emitter-base voltages on the two transistors. The direct voltage on resistor 218 is small because only base current of transistor 212 flows in it. Consequently, the voltage on resistor 200 is close to the voltage on resistor 202. If the resistor 200 is ten times the value of resistor 202, and they both have the same potential drop, a current equal to ten percent of the output load current will flow into resistor 200 and through the emitter and collector of transistor 210. Capacitor 206, having a very large capacitance value, makes it possible for high frequency signals received from transistor 98 to modulate the current in transistor 210 through the action of driver transistor 212, and thereby obtain satisfactory shunt regulation performance.

A Zener diode 214 has a breakdown voltage which is within the voltage ratings of transistors 210 and 212. If the output voltage should surge under current regulator action to an excessive level, Zener diode 214 will conduct and cause transistor 210 to conduct sufficiently to limit the output voltage to a safe value for the transistors. This voltage limit is analagous in a dual sense to the current limiter previously described for the voltage regulator supply.

When power transistors fail, it is usually as a collector-to-emitter short circuit. In the voltage regulator of FIG. 4, this was shown to cause an increase in ripple content, but not complete failure of DC regulation. In the current regulator, a collector-to-emitter short circuit in transistor 210 will result in complete failure, since this transistor will attempt to carry full load current. However, since the transistor normally carries only ten percent of full load current, fuse 216 may be given a rating of approximating this ten percent level. When full load current attempts to pass through this fuse, it will open quickly and thereby disconnect the shunt regulator from the power output. The result is normal output current, under the control of the low speed control rectifier regulator, with the output ripple current at a higher level than before. It is important to note, however, that the supply will continue to function and in many cases permit reasonably satisfactory operation of the load until repairs can be effected.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

I claim:

1. In a regulated power supply of the type in which the power from a source thereof is passed first through a relatively high efficiency first regulator, the output of said first regulator is passed through a relatively low efficiency second regulator, the output of said power supply being derived from the output of said second regulator, and including means generating an error signal which is a function of the difference between the output of the supply and a desired output, said error signal comprising a low frequency range including frequency components to which said low frequency regulator responds and a high frequency range including frequency components to which said high frequency regulator responds, the improvement comprising control means
   (A) utilizing said low frequency range of said error signal to control said first regulator, and
   (B) utilizing said high frequency range of said error signal to control said second regulator.

2. The combination defined in claim 1 in which
   (A) said control means includes an amplifier amplifying both said components of said error signal,
   (B) said amplifier has first and second output sections
      (1) said first section including a high pass filter whose output is connected to control said second regulator,
      (2) said second output section including a low pass filter whose output is connected to control said first regulator.

3. A regulated power supply comprising
(A) a low voltage section including
   (1) a first recifier unit connected to rectify an alternating current input of said power supply, and
   (2) a relatively high efficiency first regulator in said first rectifier unit connected to regulate the output voltage of said low voltage section,
(B) a high voltage section comprising
   (1) an inverter powered by the output of said low voltage section, and
   (2) a second rectifier unit connected to rectify the output of said inverter,
(C) a relatively low efficiency second regulator connected between said first rectifying unit and said inverter to control the input of said inverter,
(D) control means developing
   (1) a low frequency error signal from the output of said second rectifier unit, and
   (2) a high frequency error signal from the input of said inverter,
(E) said control means
   (1) controlling said first regulator in accordance with said low frequency signal, and
   (2) controlling said second regulator with said high frequency signal.

4. The combination defined in claim 3 in which
(A) said first regulator is a silicon-controlled-rectifier, and
(B) said second regulator is a variable resistance device connected so that variations in said resistance change the input to said inverter.

5. The combination defined in claim 4
(A) in which said variable resistance device is connected so that a relatively small portion of the low frequency components of the output of said first rectifier unit appear across it, and
(B) including means applying a relatively large portion of the high frequency components in the output of said first rectifying unit across said variable resistance device,
(C) whereby said variable resistance device exerts a relatively large degree of control over the high frequency components of the input to said inverter and a relatively low degree control over the low frequency input to said inverter.

6. The combination defined in claim 4 in which said second regulator includes
(A) a transistor whose emitter-collector current path is in series with the input of said inverter, and
(B) a capacitor connected across the output of said second regulator,
(C) whereby the ratio of the magnitude of the high frequency components in the input of said inverter to the magnitude of said high frequency components across the transistor is relatively low, and the ratio of the magnitude of the low frequency components in the input of said inverter to the magnitude of the low frequency components across said transistor is relatively high.

7. A regulated power supply comprising
(A) a low voltage section including a first rectifying unit connected to rectify an alternating current input for said power supply,
(B) a high voltage section comprising
   (1) an inverter powered by said low voltage section,
   (2) a second rectifying unit connected to rectify the output of said inverter,
(C) a silicon-controlled-rectifier connected to pass periodically pulsating direct current from said first rectifier unit,
(D) a transistor having an emitter-collector current path in series between said silicon-controlled-rectifier and said inverter, (E) means for summing with a reference voltage the high frequency components in the input of said inverter and the low frequency components in the output of said second rectifying unit, thereby to develop an error signal,
(F) means for amplifying said error signal,
(G) means for applying only the high frequency components of said amplifier error signal to the base-emitter current path of said transistor to control the collector-emitter resistance thereof, and
(H) means for controlling the firing angle of said silicon-controlled-rectifier in accordance with the low frequency components of said error signal.

8. The combination defined in claim 7 in which said firing angle controlling means includes
(A) a relaxation oscillator of the type employing a capacitor which is discharged when its voltage reaches a given level,
(B) means for charging said capacitor in accordance with said low frequency components in said amplifier error signal,
(C) means for applying a firing pulse to said silicon-controlled-rectifier each time said capacitor is discharged, and
(D) synchronizing means for synchronizing the initiation of charging of said capacitor with the periodic pulsations in the input of said silicon-controlled-rectifier.

9. A regulated power supply comprising
(A) a rectifier unit
   (1) connected to rectify an alternating current input of said power supply, and
   (2) including a relatively high efficiency first regulator connected to regulate the output voltage of said rectifier unit,
(B) a relatively low efficiency second regulator
   (1) capable of higher speed operation than said first regulator, and
   (2) connected for further regulation of the output of said first regulator by being connected in the path between said first regulator and a load to which the output of said regulator is delivered,
(C) control means developing
   (1) a low frequency error signal corresponding to the output of said second regulator and including the frequency components to which said first regulator is capable of responding, and
   (2) a high frequency error signal corresponding to the output of said second regulator and including the frequency components to which said first regulator is incapable of responding,
(D) said control means
   (1) controlling said first regulator in accordance with said low frequency signal, and
   (2) controlling said second regulator with said high frequency signal.

10. The combination defined in claim 9 in which
(A) said first regulator is a silicon-controlled rectifier, and
(B) said second regulator is a variable resistance device connected so that variations in its resistance change the output of said second regulator applied to said load.

11. The combination in claim 10
(A) in which said variable resistance device is connected so that a realtively small portion of the low frequency components of the output of said first regulator appear across it, and
(B) including applying a relatively large portion of the high frequency components of the output of said first regulator across said variable resistance device,
(C) whereby said variable resistance device exerts a relatively large degree of control over the high frequency components of the output of said second regulator and a relatively low degree of control over the low frequency output of said second regulator.

12. The combination defined in claim 10 in which said second regulator includes
   (A) a transistor whose emitter-collector current path is in series between said first regulator and said load, and
   (B) a capacitor connected across the output of said second regulator,
   (C) whereby the ratio of the magnitude of the high frequency components applied to the load to the magnitude of said high frequency components across said transistor is relatively low, and the ratio of the magnitude of the low frequency components applied to the said load to the magnitude of the low frequency components across said transistor is relatively high.

13. A regulated power supply comprising
   (A) a rectifier unit
      (1) connected to rectify an alternating current input of said power supply, and
      (2) including a relatively high efficiency first regulator connected to regulate the output current of said rectifier unit,
   (B) a load connected to receive the output of said rectifier as regulated by said first regulator,
   (C) a relatively low efficiency second regulator connected across the line between said rectifier and said load to control the current to said load,
   (D) control means developing
      (1) a low frequency error signal corresponding to the current to said load, and
      (2) a high frequency error signal corresponding to said load current,
   (E) said control means
      (1) controlling said first regulator in accordance with said low frequency signal, and
      (2) controlling said second regulator with said high frequency signal.

14. The combination defined in claim 13 in which
   (A) said second regulator includes a transistor and means connecting the emitter-collector path of said transistor across the line in shunt with said load, and
   (B) said control means increases the current through said transistor when said load current tends to increase and decreases the current through said transistor when said load current tends to decrease.

15. A current regulated power supply comprising
   (A) a rectifier unit
      (1) connected to rectify an alternating current input of said power supply, and
      (2) including a relatively high efficiency first regulator connected to regulate the output current of said rectifier unit,
   (B) a load connected to receive current from said rectifier unit as regulated by said first regulator,
   (C) a relatively low efficiency second regulator connected between said rectifier unit and said load,
   (D) said second regulator comprising
      (1) a first resistor in series between said rectifier unit and said load,
      (2) a transistor having an emitter, a collector and a base, and
      (3) a second resistor in series with the emitter-collector current path of said transistor across the line between said first resistor and said rectifier unit,
   (E) means developing a low frequency error signal corresponding to the current delivered to said load,
   (F) means developing a high frequency error signal corresponding to said load current,
   (G) first control means controlling said first regulator in accordance with said low frequency signal, and
   (H) second control means controlling the base-emitter current of said first transistor in accordance with said high frequency signal.

16. The combination defined in claim 15 in which said second regulator includes
   (A) a second transistor direct coupled to said first transistor to drive said first transistor,
   (B) means coupling the base of said second transistor to said second control means,
   (C) a third resistor having one end connected to said base of said second transistor and the other end thereof connected to the side of said line in which said second resistor is connected and between said first resistor and said load, and
   (D) a fourth resistor connected between said emitter of said second transistor and said emitter of said first transistor.

17. The combination defined in claim 16 in which said second regulator further includes
   (A) a capacitor, and
   (B) means connecting said capacitor between said load and said emitter of said first transistor.

References Cited

UNITED STATES PATENTS 3,199,015   8/1965   Lackey et al. _________ 323—22
3,213,351  10/1965   Walker ______________ 323—22

OTHER REFERENCES

Electronics, "Power Supply Uses Switching Preregulation," March 9, 1962.

JOHN F. COUCH, *Primary Examiner.*

W. H. BEHA, *Assistant Examiner.*

UNITED STATES PATENT OFFICE
CERTIFICATE OF CORRECTION

Patent No. 3,353,080                            November 14, 1967

William F. Santelmann, Jr.

It is certified that error appears in the above identified patent and that said Letters Patent are hereby corrected as shown below:

Column 4, line 73, "connector-emitter" should read -- collector-emitter --. Column 10, line 17, "transitsor" should read -- transistor --. Column 13, line 3, "recifier" should read -- rectifier --. Column 14, line 66, "realtively" should read -- relatively --; line 69, after "including" insert -- means --.

Signed and sealed this 16th day of September 1969.

(SEAL)
Attest:

Edward M. Fletcher, Jr.                       WILLIAM E. SCHUYLER, JR.
Attesting Officer                               Commissioner of Patents